United States Patent
Chen

[19]

[11] Patent Number: 5,875,733
[45] Date of Patent: Mar. 2, 1999

[54] FEEDING DEVICE FOR POULTRY

[76] Inventor: Ai-Mei Chen, No. 455, Min Sheng Rd., She Tou Hsian, Chang Hua Hsien, Taiwan

[21] Appl. No.: 900,534

[22] Filed: Jul. 25, 1997

[51] Int. Cl.[6] .................................................. A01K 39/01
[52] U.S. Cl. ............................................ 119/57.4; 119/53
[58] Field of Search ......................... 119/57.4, 53, 52.1, 119/61

[56] References Cited

U.S. PATENT DOCUMENTS

| | | | |
|---|---|---|---|
| 5,007,380 | 4/1991 | Badia et al. ........................... | 119/53 |
| 5,092,274 | 3/1992 | Cole et al. ........................... | 119/57.4 |
| 5,097,797 | 3/1992 | Van Zee et al. ...................... | 119/57.4 |
| 5,101,765 | 4/1992 | Manfrin ................................ | 119/53 |
| 5,101,766 | 4/1992 | Runion ................................. | 119/53 |
| 5,113,797 | 5/1992 | Van Daele .......................... | 119/57.4 X |
| 5,311,839 | 5/1994 | Pollock et al. ..................... | 119/57.4 X |
| 5,406,907 | 4/1995 | Hart ................................... | 119/57.4 X |
| 5,497,730 | 3/1996 | Van Daele et al. ................. | 119/57.4 X |

*Primary Examiner*—Michael J. Carone
*Assistant Examiner*—Yvonne R. Abbott
*Attorney, Agent, or Firm*—Bacon & Thomas

[57] ABSTRACT

A feeding device includes a drop tube assembly connected to a conveyor tube, a lower member slidably mounted to the drop tube assembly, a pan movably supported by a ring member and a grill assembly connected to the ring member. The drop tube assembly has two groups of ridges extending outwardly therefrom and a passage is defined between the two groups of the ridges. The grill assembly includes an upper ring and a lower ring with a plurality of ribs connected therebetween, the upper ring having a position member extending from an inner periphery thereof so that the drop tube assembly is adjustably positioned relative to the grill assembly by entering the position member between two adjacent ribs of the drop tube assembly.

3 Claims, 5 Drawing Sheets

FEEDING DEVICE FOR POULTRY

BACKGROUND OF THE INVENTION

1. Field of the Invention

The present invention relates to a feeding device and, more particularly, to an improved feeding device connected to a conveyor tube from which feed drops into the feeding device which includes an adjustable drop tube and a gap is maintained between a feed pan and a separate tube connected to the drop tube.

2. Brief Description of the Prior Art

A known poultry feeder is disclosed in U.S. Pat. No. 5,311,839, issued on May 17, 1994. An upper central drop tube, a lower central drop tube and a cylindrical wall in the poultry feeder can be adjustable by a pawl/rack mechanism. However, such a mechanism is separated from users by the ribs of the grill assembly so that the users have to insert their hands into the grill assembly to operate the pawl/rack mechanism. Generally, the space between two adjacent ribs is very small. Furthermore, the pawl/rack mechanism involves a complicated structure so that it raises the manufacturing cost.

The present invention intends to provide an improved feeding device to mitigate and/or obviate the above-mentioned problems.

SUMMARY OF THE INVENTION

In accordance with one aspect of the present invention, there is provided a feeding device comprising a pan having a conical bottom and a flange in which at least two notches are defined, a ring member having a second flange extending inwardly from a lower edge thereof and at least two blocks extending inwardly therefrom so that the flange is supported by the second flange with the blocks received in the notches.

A drop tube assembly has an upper end connected to a conveyor tube from which feed drops into the drop tube assembly, two groups of ridges respectively extending outwardly from the drop tube assembly and a passage defined between the two groups of the ridges, a third flange extending radially and outwardly from a lower end of the drop tube assembly.

A lower member is slidably mounted to the drop tube assembly and comprises a tubular portion and a skirt portion, the tubular portion having a fourth flange extending radially and inwardly from an upper edge thereof so as to restrict the third flange from disengaging therefrom, at least three legs extending downwardly from the lower edge of the tubular portion and longer than a lower edge of the skirt portion.

A grill assembly comprises an upper ring, a lower ring and a plurality of ribs connected between the upper ring and the lower ring, the upper ring having a position member extending from an inner periphery thereof so that the drop tube assembly is movably received in the upper ring and positioned by moving the position member along the passage and into a space defined between two adjacent ridges. The lower ring has at least two clamping members pivotally connected thereto so as to clamp the ring member.

It is an object of the present invention to provide a feeding device wherein a drop tube assembly is easily adjusted relative to a grill assembly.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
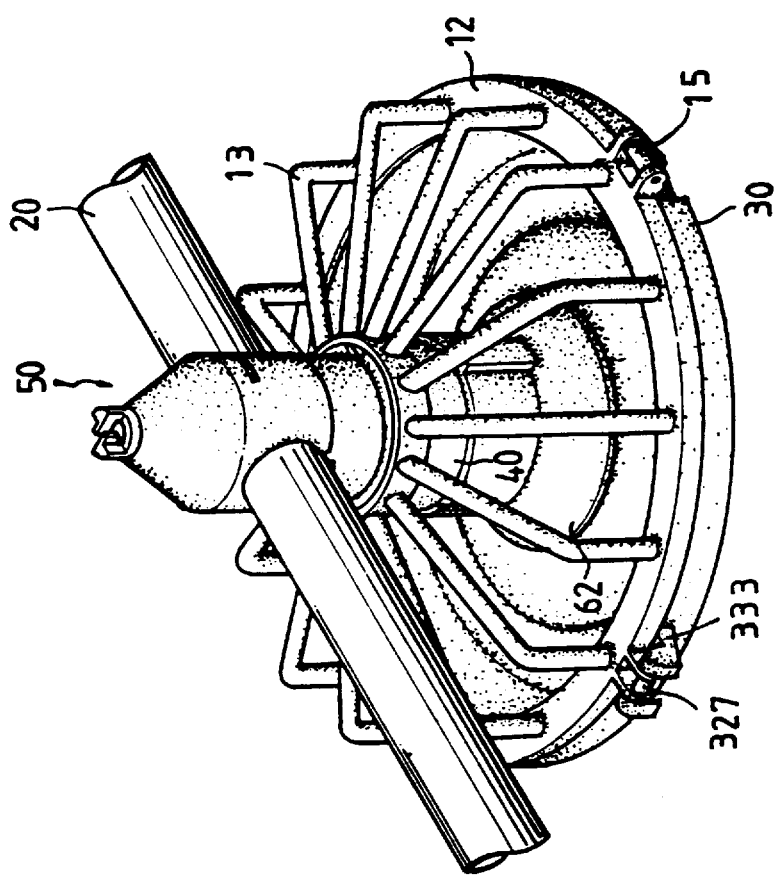
FIG. 1 is a perspective view of a feeding device in accordance with the present invention.
Figure 2:
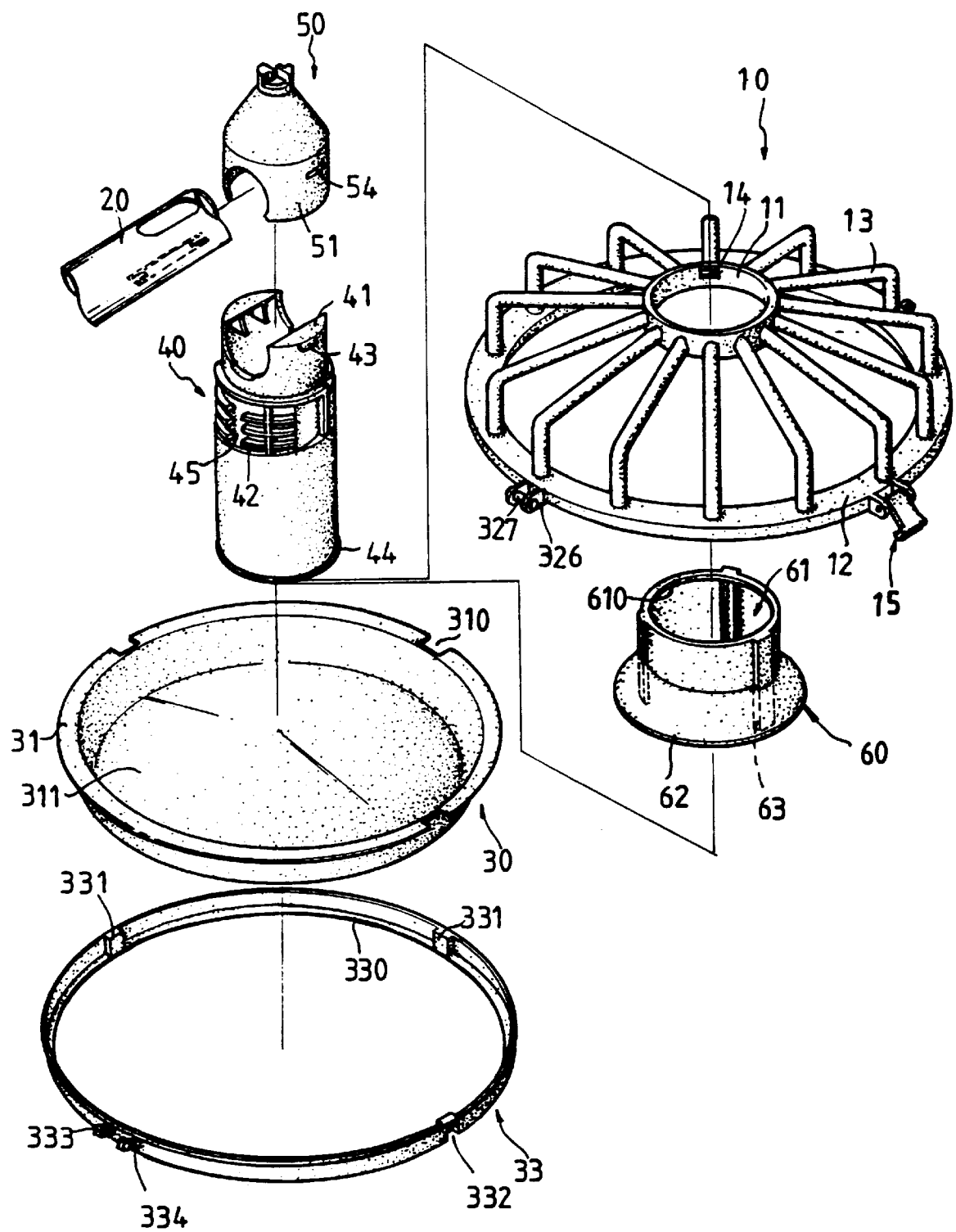
FIG. 2 is an exploded view of the feeding device in accordance with the present invention.
Figure 3:
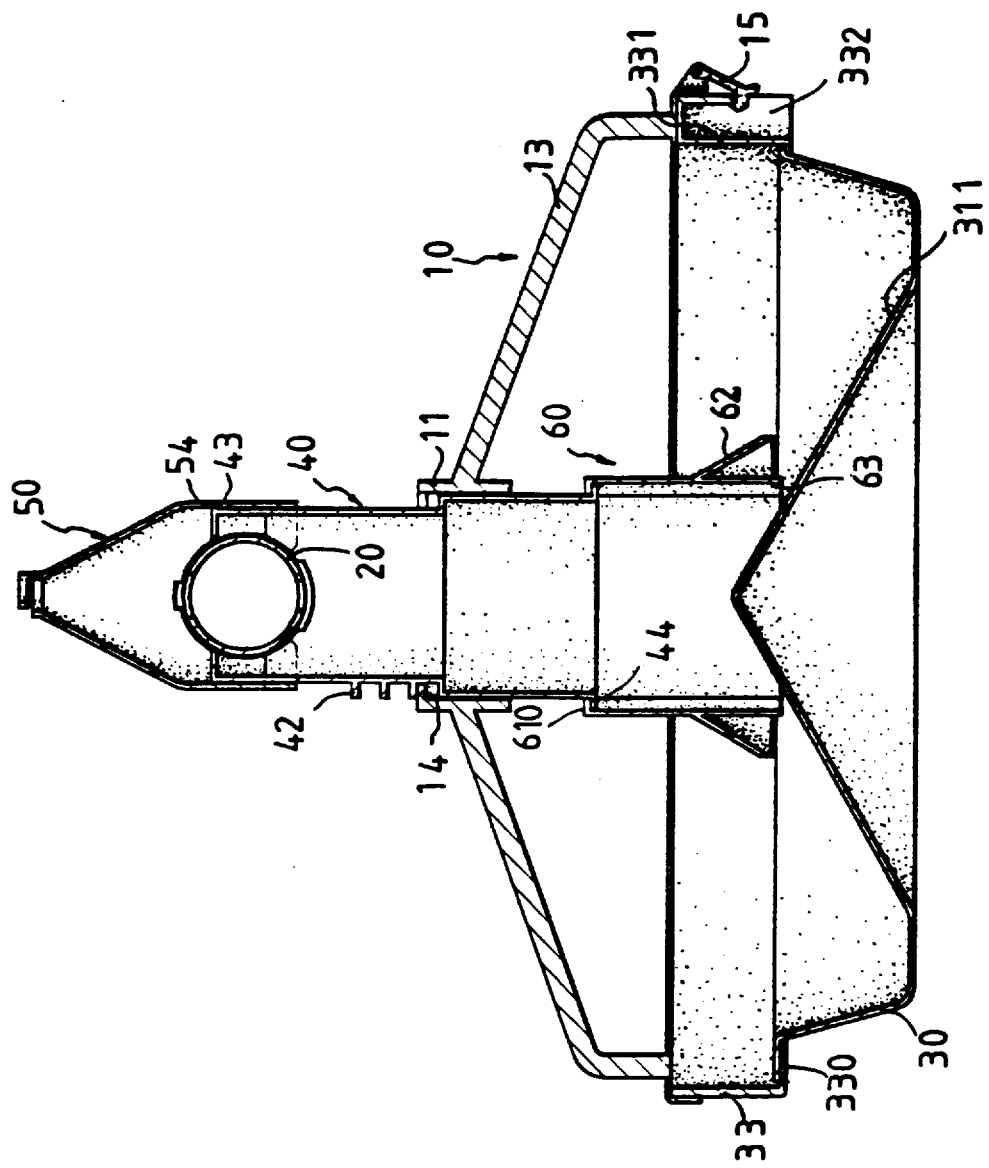
FIG. 3 is a side elevational view, partly in section, of the feeding device in accordance with the present invention.

Referring to the drawings and initially to FIGS. 1 through 3, a feeding device in accordance with the present invention generally includes a pan 30 supported by a ring member 33 which is clamped by a grill assembly 10 and a drop tube assembly movably received through the grill assembly 10.

The pan 30 has a conical bottom 311 from which a peripheral wall extends, a flange 31 extending radially and outwardly from the peripheral wall and having at least two notches 310 defined therein. The ring member 33 has a second flange 330 extending radially and inwardly from a lower edge thereof and at least two blocks 331 extending inwardly from an inner periphery thereof so that the flange 31 is supported by the second flange 330 with the blocks 331 received in the notches 310. The ring member 33 has at least two recesses 332 defined in an outer periphery thereof and located in opposite to the blocks 331. The ring member 33 further has two pairs of supporting studs 333 extending outwardly therefrom and each of the supporting studs 333 has a concavity 334 defined in an upper surface thereof.

The drop tube assembly comprises a head 50 and a drop tube 40 wherein the head 50 has two side plates 51 extending separately and downwardly therefrom and each of the side plates 51 has a slot 54 defined therethrough. The drop tube 40 has an upper end with two jaws 41 extending separately therefrom and a lower end with a third flange 44 extending radially and outwardly therefrom. Each of the jaws 41 has a protrusion 43 extending outwardly therefrom so that the drop tube 40 is connected to the head 50 by receiving the two protrusions 43 into the two slots 54. A conveyor tube 20 is securely received between the two jaws 41 and the two side plates 51 so that feed drops from the conveyor tube 20 into the drop tube 40. Two groups of ridges 42 respectively extend outwardly from the drop tube 40, the ridges 42 extending perpendicularly to a longitudinal axis of the drop tube 40 and in parallel with each other. A passage 45 is defined between the two groups of the ridges 42 and the passage 45 extends in parallel with the longitudinal axis of the drop tube 40.

The lower member 60 comprises a tubular portion 61 and a skirt portion 62 which extends radially and outwardly from a lower edge of the tubular portion 61. The tubular portion 61 has a fourth flange 610 extending radially and inwardly from an upper edge thereof so that the drop tube 40 is slidably received in the lower member 60 and the third flange 44 is restricted by the fourth flange 610 so that the drop tube 40 will not be disengaged from the lower member 60. At least three legs 63 extend downwardly from the lower edge of the tubular portion 61 and the three legs 63 extend longer than a lower edge of the skirt portion 62 so that when the three legs 63 contact the conical bottom 311 of the pan 30, there still have gaps defined between the conical bottom 311 and the skirt portion 62 so as to allow feed to flow to the pan 30.

The grill assembly 10 comprises an upper ring 11, a lower ring 12 and a plurality of ribs 13 connected between the upper ring 11 and the lower ring 12. The upper ring 11 has a position member 14 extending radially and inwardly from an inner periphery thereof so that the drop tube 40 is movably received in the upper ring 11 and positioned by moving the position member 14 along the passage 45 and into a space defined between two adjacent ridges 42. The lower ring 12 has at least two clamping members 15 pivotally connected thereto so as to clamp the ring member 33 by being received in the recesses 332. The lower ring 12 further has two pairs of lugs 326 extending outwardly therefrom and a rod 327 is connected between each pair of the lugs 326 so that when the lower ring 12 is connected to the ring member 33, the rod 327 is respectively force-fitted into the respective concavities 334.

Figure 4:
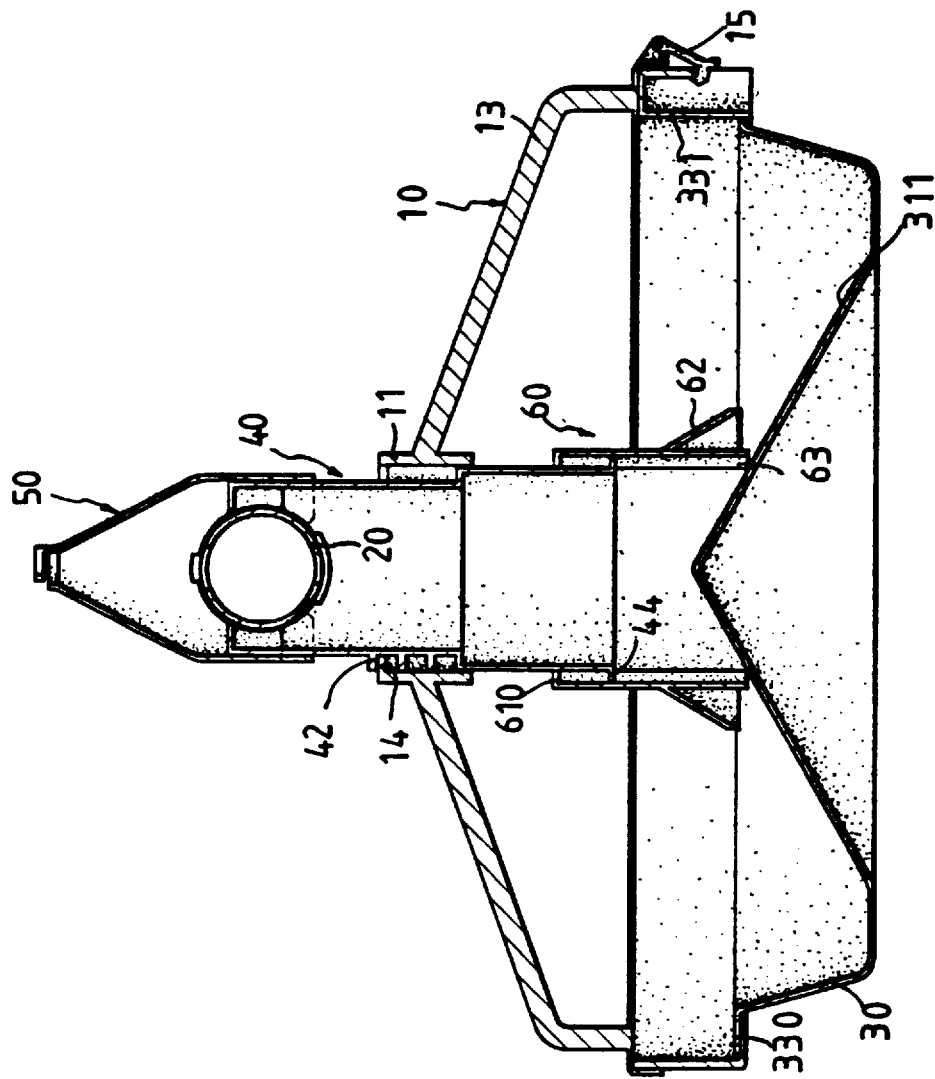
FIG. 4 is a side elevational view, partly in section, of the feeding device wherein the drop tube is lowered relative to the grill assembly.
Figure 5:
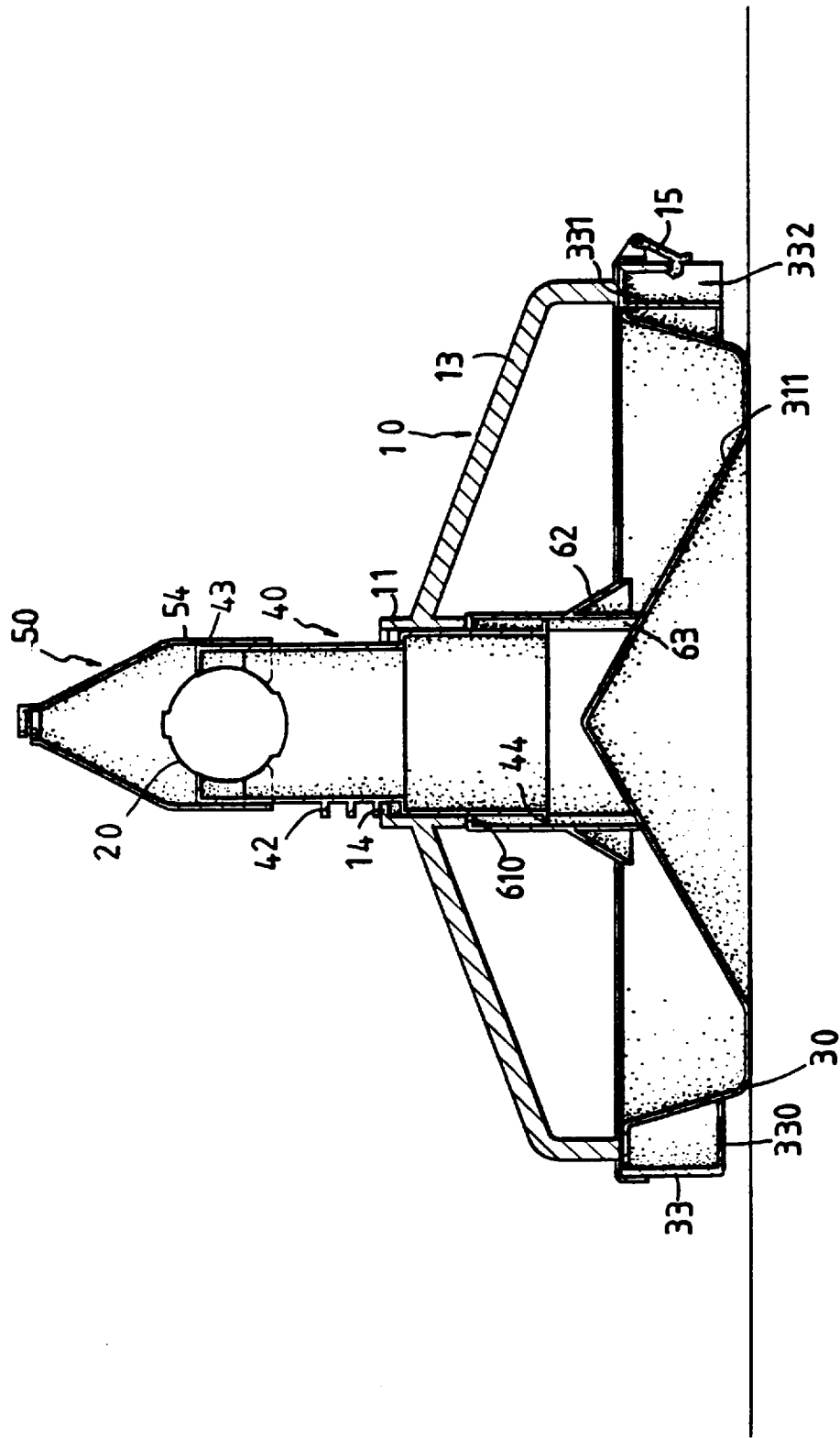
FIG. 5 is a side elevational view, partly in section, of the feeding device wherein the feeding device is put on a supporting surface.

Referring to FIG. 4, a position relationship between the grill assembly 10 and the drop tube 40 is adjusted simply by rotating the grill assembly 10 to move the position member 14 along the passage 45 and into another space between the ridges 42. This action is very easy when compared with that of the feeding device in the prior art. Referring to FIG. 5, when the feeding device is put on a supporting surface, the pan 30 is raised relative to the ring member 33 so that a height from the pan 30 to the ribs 13 is shortened and small birds (not shown) can have the feed in the pan 30. Furthermore, the head 50 and the drop tube 40 is easily disengaged when needed.

Although the invention has been explained in relation to its preferred embodiment, it is to be understood that many other possible modifications and variations can be made without departing from the spirit and scope of the invention as hereinafter claimed.

What is claimed is:

1. A feeding device comprising:

a pan having a conical bottom from which a peripheral wall extends, a flange extending radially and outwardly from said peripheral wall and having at least two notches defined therein;

a ring member having a second flange extending radially and inwardly from a lower edge thereof and at least two blocks extending inwardly from an inner periphery thereof so that said flange is supported by said second flange with said blocks received in said notches;

a drop tube assembly having an upper end connected to a conveyor tube from which feed drops into said drop tube assembly, two groups of ridges respectively extending outwardly from said drop tube assembly, said ridges extending perpendicularly to a longitudinal axis of said drop tube assembly and in parallel with each other, a passage defined between said two groups of ridges, said passage extending in parallel with said longitudinal axis of said drop tube assembly, a third flange extending radially and outwardly from a lower end of said drop tube assembly;

a lower member comprising a tubular portion and a skirt portion extending radially and outwardly from a lower edge of said tubular portion, said tubular portion having a fourth flange extending radially and inwardly from an upper edge thereof and at least three legs extending downwardly from said lower edge thereof, said three legs extending longer than a lower edge of said skirt portion, said lower member slidably mounted to said drop tube assembly and said third flange of said drop tube assembly being stopped by said fourth flange;

a grill assembly comprising an upper ring, a lower ring and a plurality of ribs connected between said upper ring and said lower ring, said upper ring having a position member extending radially and inwardly from an inner periphery thereof so that said drop tube assembly is movably received in said upper ring and positioned by moving said position member along said passage and into a space defined between two adjacent ridges, said lower ring having at least two clamping members pivotally connected thereto so as to clamp the ring member.

2. The feeding device as claimed in claim 1 wherein said drop tube assembly comprises a drop tube and a head which has two side plates extending separately and downwardly therefrom and each of said side plates has a slot defined therethrough, said drop tube having an upper end with two jaws extending separately therefrom, each of said jaws having a protrusion extending outwardly therefrom so that said drop tube is connected to the head by receiving said two protrusions received in said two slots.

3. The feeding device as claimed in claim 1 wherein said ring member has at least two recesses defined in an outer periphery thereof so as to receive said two clamping members when said grill assembly is connected to the ring member.

* * * * *